April 10, 1928. Re. 16,932

A. L. RASEY

CLARIFYING DEVICE FOR LIQUIDS

Original Filed June 26, 1922

INVENTOR.

Albert L. Rasey

BY

Erwin, Wheeler & Woolard

ATTORNEYS

Reissued Apr. 10, 1928. Re. 16,932

UNITED STATES PATENT OFFICE.

ALBERT L. RASEY, OF MILWAUKEE, WISCONSIN.

CLARIFYING DEVICE FOR LIQUIDS.

Original application filed June 26, 1922, Serial No. 570,880. Divided and application filed January 7, 1924, Serial No. 684,734. Original No. 1,602,935, dated October 12, 1926. Application for reissue filed January 30, 1928. Serial No. 250,648.

This invention relates to improvements in clarifying devices for liquids. The specific disclosure herein relates more particularly to an embodiment of my invention which is peculiarly adapted to remove physical impurities from oil.

It is the primary object of this invention to produce a device capable of effecting the rapid removal from any liquid all physical impurities, such as solids or other liquids of greater specific gravity than the liquid to be purified. Filters and other devices now available are both cumbersome in size and slow in operation.

It is a further object of this invention to provide a clarifying device of such a size and character as to be peculiarly adapted for association with the circulatory lubricating system of an internal combustion engine or the like.

The application of a clarifying device to a circulatory system for lubricating oil involves certain problems which to the best of my knowledge, have not hitherto been solved. Attempts have been made to clarify the oil in such systems by the introduction of screens and similar mechanism for filtering the oil. These expedients have proven unsuccessful for the reason that in a very short space of time the filters or screens have become clogged and wholly inoperative. In my copending application filed March 8, 1920, Serial No. 364,335, and entitled Separators, I described a device which I have used with partial success in a circulatory system for lubricating oil. In the device disclosed in that application I utilized the current of an automobile generator to energize magnets arranged in the path of flow of the oil to the end that these magnets might draw from the oil all particles of magnetizable metal carried therein. I found that as long as the generator was operative the magnets accumulated a clot of impurities but that when the generator ceased to function due to the reduction in speed or to the stopping of the motor the clot of impurities held by the magnets was released and allowed to return into the circulatory system where it tended to stop the passages and minute openings in the motor. Furthermore the device disclosed in the above identified application did not permanently remove from the liquid fluid and other nonmagnetic impurities carried thereby.

It will be readily understood, therefore, that further objects of the present invention are to provide a clarifying device which will wholly and permanently remove from liquid passed therethrough any magnetic or nonmagnetic physical impurities carried by said liquid; to provide convenient and simple means for collecting and drawing off such impurities whereby the circulatory system may be permanently rid of them; and to provide a simple, compact and easily constructed mechanism capable of achieving the desired clarification of the oil or other liquid passed therethrough.

In the drawings:—

Like parts are identified by the same reference characters throughout the several views, which illustrate the device in service in association with an internal combustion engine under conditions for which the embodiment herein disclosed is particularly designed.

Figure 1:
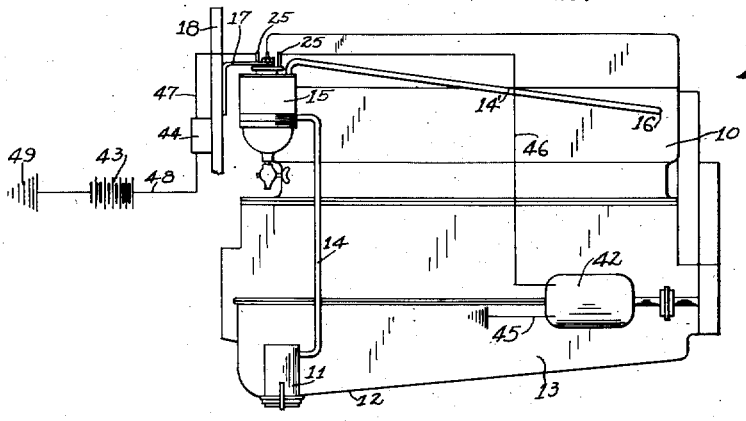
Fig. 1 is a side elevation of the internal combustion engine of a motor vehicle with a device embodying my invention applied thereto, portions of the electrical system of the vehicle being illustrated diagrammatically.

An internal combustion engine is represented at 10, and 11 represents an oil pump which is preferably mounted, as usual, in association with the lowest portion of the sump 12 of the crank case 13, of the internal combustion engine 10. A pipe 14 connects the delivery end of oil pump 11 through my improved clarifying device 15 with a point 16 adjacent the top of the internal combustion engine. It will be understood that the oil pumped by the device 11 will be distributed to the several bearings of the internal combustion engine either by gravity or by the pressure system, according to the preferences of each engine manufacturer. To install the oil clarifying chamber 15 it is only necessary to cut the pipe 14 (the delivery pipe from the pump) and to insert the chamber 15 into the lubricating system by attaching thereto the severed ends of pipe 14.

The chamber 15 is shown in Fig. 1 to be supported by a bracket 17 from an upright member such as the board 18 which is intended to represent, diagrammatically, a portion of the dash of the vehicle. Bracket 17 preferably comprises a single resilient piece of metal bent to the form shown in Fig. 1 and apertured adjacent its end in order that it may be clamped between nuts 19 and 20 upon the bolt 21 which is centrally disposed within chamber 15.

The oil clarifying chamber 15 includes an upper or body portion 22 of cylindrical shape and closed at its top with the exception of the port 23 through which the interior of the chamber is put into communication with the discharge end 14′ of pipe 14. The bolt 21 is threaded into the upper portion of the cylindrical body 22 of the chamber and is axially disposed therein. The lock nut 20 threaded upon bolt 21 has the further function of securing against the body 22 of the chamber a fiber plate 24 upon which binding posts 25 for the electrical connections are conveniently mounted. As previously stated, the bolt 21 is made of sufficient length to permit the threading thereon of a second nut 19 between which and the nut 20, the laterally projecting arm of bracket 17 is secured.

A cup shaped member 26 is threaded upon the lower end of the cylindrical body portion 22 of the clarifying chamber. This cup shaped member 26 is ported at 27. A stop cock 28 controls the delivery of material through said port.

Figure 2:
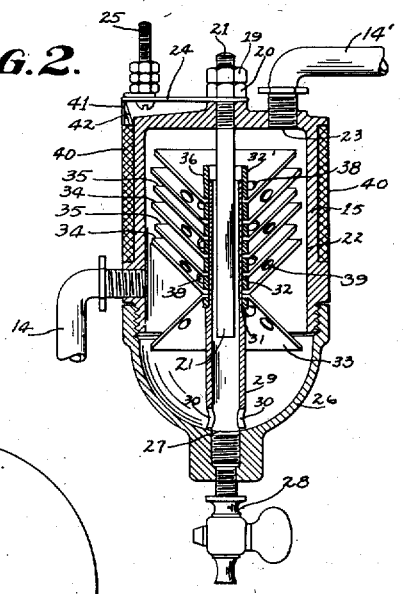
Fig. 2 is a vertical central section through the chamber within which clarification of liquid is effected.

A tube 29 has its lower end threaded in such a way as to permit this tube to be screwed downwardly into the port 27 in the manner indicated in Fig. 2. Openings 30 through the tube afford communication between the interior of the tube and the interior of the cup shaped bottom closure 26 to the end that any material accumulating in the cup shaped member may readily be drawn off through the stop cock 28.

It will be noted that tube 29 is centrally positioned within chamber 15 and is adapted to receive bolt 21 with a fairly close fit. The arrangement is such that the bolt 21 and tube 29 serve as guides to facilitate the manipulation of the cup shaped cap 26 into its proper position of engagement with the lower end of the cylindrical body portion 22 of the chamber.

Figure 3:
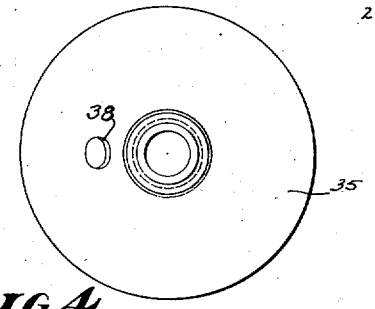
Figs. 3 and 4 are detail views upon an enlarged scale of two of the conical cups which are disposed within the clarifying device shown in Fig. 2.
Figure 4:
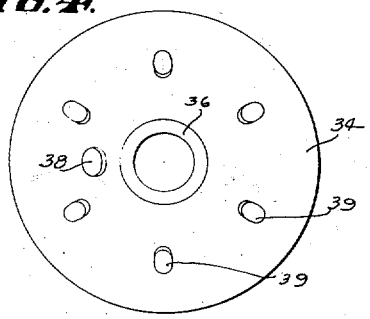

The tube 29 is shouldered at 31 and has a reduced diameter from that point to its upper extremity. Supported from the shoulder 31 are a number of substantially conical cups spaced from each other and from said shoulder by collars 32. The bottommost cup 33 is preferably inverted as shown in Fig. 2. The remaining cups 34 and 35 are alternately of the character shown in Fig. 4 and Fig. 3. Each of the several cups, 33, 34, and 35 is similar to each other cup in its shape,—each is preferably the shape of a truncated cone at its smaller end,—each cup is provided with an inwardly directed, annular flange 36. These flanges 36 are disposed upon the reduced upper portion of tube 29 and are confined between adjacent spacing collars 32. A collar 32′ threaded upon the upper extremity of tube 29 clamps the entire assembly of cups and spacing collars in place upon the tube.

Cups 33, 34, and 35 are each provided with an opening 38 very close to the flange 36. Cups 34 and 33 differ from cups 35 in that each of the cups 34 and 33 is preferably of slightly greater diameter at its larger end than the cups 35 and is also provided with a plurality of openings 39 in addition to the opening 38 above mentioned. By referring to Fig. 2 it will be noted that the cups 34 project outwardly to a point extremely close to the inner wall of the cylindrical body portion 22 thereby tending to cause a liquid flowing through chamber 15 to pass through the openings 39 rather than to pass outside of the periphery of cup 34. Each cup 35, however, lacks the openings 39 and the periphery of these cups is correspondingly farther removed from the inner wall of the cylindrical member 22. Thus the several cups act as baffle plates and cause liquid flowing through chamber 15 to flow around cups 35 and through cups 34 for the most part. It is not necessary for the proper functioning of this apparatus that cups 34 be so large as to fit tightly within cylinder 22 and prevent the passage of liquid about their peripheries. In fact I believe it advisable to allow a small portion of the liquid to pass through the extremely limited space available between the peripheries of cups 34 and the inner face of member 22.

The exterior of the cylinder 22, which forms the body of the device, is peripherally recessed and is thereby adapted to receive an electrical winding indicated at 40 in Fig. 2. The two ends 41 and 42 of the wire which comprises winding 40 are led outwardly at the top of the device and are connected with binding posts 25. Means hereinafter to be described is provided for supplying current through binding posts 25 to the winding 40 and thereby creating a magnetic field.

The chamber 15 including the body portion 22 and the lower closure 26 thereof is preferably made of non-magnetic material, such as white metal or aluminum. The several cups 33, 34, and 35 and bolt 21 are preferably made of soft iron or some other good conductor of magnetic lines of force. The arrangement is such that the tube 29 and bolt 21 will constitute a core in which the magnetism developed by the current flowing through the winding 40 will be concentrated. The metal of each of the cups 34 and 35 will also be magnetized, but the strength of the magnetism in those elements will decrease toward their peripheries. Thus when a magnetic particle is withdrawn from the oil at the periphery of one of the cups 34 or 35 the particle will tend to pass inwardly toward the tube 29 due to the greater magnetism existing in the center of the device.

The manner in which I prefer to connect my improved clarifying device in the electrical circuit of a motor vehicle is indicated digrammatically in Fig. 1.

Practically every modern motor vehicle is provided with a generator 42, a battery 43, and a cut-out 44, the latter being adapted to break the circuit between the generator 42 and battery 43 when the current output of the generator falls below a predetermined quantity. The obvious and well known function of the cut-out is to prevent the current stored in the battery from expending itself through the windings of the generator at such times as the generator is not in operation.

A single wire system is illustrated. One terminal of the generator is connected with the ground at 45 and the other is connected by wire 46 with one of the binding posts 25 carried at the top of the clarifying chamber 15. From the other of the binding posts 25 a wire 47 leads to the cut-out device 44, which is commonly mounted upon the dash 18. A conductor 48 leads from the cut-out 44 to one terminal of the battery 43, the other terminal being grounded at 49.

It will be understood from the foregoing that the generator, the winding 40 upon the clarifying chamber 15, the circuit breaker or cut-out 44, and the battery 43 are all connected in series. When the cut-out device 44 is in its closed position the current delivery from the generator to the battery must necessarily pass about the winding 40 upon the clarifying chamber 15. It is not necessary to utilize a great deal of energy in the coil 40. In the devices which I have actually constructed and put into operation the current loss is so small that it cannot be detected with an ordinary ammeter. The arrangement is obviously such that this device consumes a minimum of current. The magnetic coil 40 is only operative while the generator 42 is charging the battery. In other words, as soon as the engine is in operation the coil 40 will be carrying electricity and the magnetic elements of the device will be energized. As soon, however, as the motor drops below the speed necessary for charging the battery, or when the motor is stopped altogether, the automatic cut-out device 44 becomes operative to break the circuit and the coil 40 of the clarifying chamber is disconnected from the battery. I am thus able to provide current for my device when current is needed and to render the operation of the device wholly automatic so that the current is shut off to prevent wastage of the battery at such times as the oil is not circulated through the clarifying chamber 15.

Where the device is used elsewhere than in a motor vehicle its coils will be energized through any switch controlled electrical circuit and the operator may turn the current through the device at such times as oil or other liquid is passing therethrough.

The operation of this device is as follows:

When the motor 10 is running, the oil collecting in the sump portion 12 of the crank case 13 will be impelled by pump 11 through pipe 14 into an intermediate portion of the chamber 15. It will be noted by reference to Fig. 2 that the pipe 14 discharges into the chamber above the inverted conical cup 33 and between the cups 33 and 34. It is the function of cup 33 to provide a partial closure for the lower portion of chamber 15 in which the sludge or foreign particles removed from the oil by the operation of this device may collect without becoming entrained by the flow of oil entering the device through pipe 14.

The oil flows very slowly through chamber 15. It would be possible to make tube 29 non-magnetic and to make the cylinder portion 22 of magnetic material, the arrangement being such as to draw the magnetic particles outwardly instead of inwardly, but in that construction the oil would have a comparatively rapid rate of flow since it would pass about the baffle plates at their small ends instead of at their outer extremities, as in the present device. For this reason the construction illustrated is preferred. Another reason for preferring the present construction is found in the fact that herein the magnetism is concentrated at a point remote from the path of liquid flow so that there is a constant tendency to withdraw magnetic material toward the axis of the device and out of the course of flow of the liquid. The oil or other liquid entering through pipe 14 passes upwardly within cylinder 22 until it encounters the cup or the baffle 34. The combined area of the several holes 39 in this cup, together with the area of the space between the periphery of the cup and the inner wall of cylinder 22 is, obviously, greatly in excess of the area of pipe 14. The rate of flow of the oil past this baffle, and the other in the series, will, therefore, be comparatively slow.

A small part of the oil will flow between the periphery of the plate 34 and cylinder 22. Such oil as follows this course will pass the periphery of cup 34 in the form of a thin film so that any particles of foreign matter carried by the oil will be brought in extremely close proximity to the periphery of the cup. If these particles of foreign matter are of magnetic material they will cling to the cup and will gradually pass downwardly along its inner surface toward the center of the device, being urged in that direction not only by the greater magnetism existing at the center of the device but also by gravity. Non-magnetic material will also accumulate about the peripheries of the cups and will tend to pass downwardly toward their lower portions. Doubtless some of this non-magnetic matter adheres to magnetic particles and is drawn with the magnetic particles to the center of the device. Other non-magnetic particles doubtless adhere to the cups themselves until they are dislodged by the flow of liquid past them or by some other cause and are actuated by gravity toward the bottom of the cup. The space between each pair of cups also constitutes a settling chamber wherein the speed of the oil is greatly reduced. The non-magnetic particles which have been carried in suspension by the rapidly moving oil will settle out when the speed of the oil is reduced following its entry into one of the relatively large spaces between adjacent cups or baffles.

It has already been stated that a portion of the oil passes between the periphery of cup 34 and the inner wall of cylinder 22. The remainder of the flow will take place through the several openings 39. In the next succeeding cup 35, however, no openings 39 are provided and it is necessary that the entire flow of the liquid take place about the periphery of the cup. In order not to restrict unduly the flow of oil through the device, cup 35 is of smaller size than cup 34 and a greater unobstructed area lies adjacent its periphery. The thickness, however, of the film of oil delivered over the periphery of any of the cups 35 is relatively very small and any magnetic particles still carried by the oil must pass so closely to cup 35 as to come within the field of magnetic attraction exercised by said cup and hence will tend to be drawn from the oil and retained by the cup.

Above cup 35 is a second cup 34 and as previously stated, it will be necessary for a large part of the oil passing about the periphery of cup 35 to find its way through the opening 39 of the succeeding cup 34. This construction brings about a downward current of oil between the first cup 35 and the second cup 34, thereby facilitating the movement toward the center of the device of any particles of foreign matter which have been retained magnetically or otherwise by cup 35. Furthermore when the body of the oil moving downwardly between cups 35 and the second cup 34 turns upwardly to pass through openings 39 there will be a tendency for all solid matter carried in suspension to precipitate toward the bottom of cup 35.

During the progress of the oil through this device it is subjected repeatedly to the action of the mechanical and magnetic agencies tending to remove all foreign matter therefrom. It has been found that even water and other like liquids with greater specific gravity than the oil will become separated from the oil during the passage of the oil through this device. When, eventually, the oil reaches the top of chamber 15 and passes out through pipe 14′ it will be clarified and free from all grit or other foreign matter.

It will be remembered that each of the cups 34 and 35 is provided adjacent its smaller end with an opening 38. As the sludge or foreign matter gradually accumulates in the cups it falls downwardly through openings 38 toward the bottom of the device and eventually reaches the cap 26 within which it is retained until the cock 28 is opened. The chamber 15 is preferably located well above the remainder of the circulatory system of the motor so that when cock 28 is opened only such oil as is retained within the chamber will flow out. The flow of oil from the chamber will carry with it practically the entire accumulation of sludge, grit and water from cups 34 and 35 as well as from cap 26. If, however, it is desired to give the device a more thorough cleaning the cap 26 may be unscrewed from the body portion 22 and, when removed therefrom, will carry with it the entire assembly of nested cups 34 and 35 leaving only the bare interior of the cylindrical body portion 22 and the bolt 21 projecting centrally downwardly therein. Obviously, the device may then be thoroughly cleansed and readily restored to operative condition by replacing cap 26.

It will be noted that beneath the openings 39 (toward the center of the device from said openings) there is a considerable space for the accumulation of foreign matter. In other magnetically operated oil clarifying devices it has been a fact that as soon as the supply of current to the devices became low or was cut off altogether, due to the low speed of operation of the motor, the electrically induced magnetism would no longer exist and the clot of material accumulated by the magnets would be released to be carried on by the flow of oil through the device into the lubricating passages of the motor where there was a serious tendency for this material to catch and clog the lubricating circuit. This difficulty has been completely overcome by the present device. Whether or not current is flowing through the energizing coil 40, any and all material which has been withdrawn from the liquid either mechanically or magnetically is permanently retained in the lower portions of the cup out of reach of currents which might tend to draw these particles again into the main flow of the oil.

This device is particularly well suited for use upon a motor vehicle or in combination with an internal combustion engine. I have found that the vibration set up by the operation of an internal combustion engine (such as the engine of a motor vehicle) is very helpful in effecting a separation of both the magnetic and non-magnetic particles from the oil. It is clear that when a bit of iron or other magnetizable material has been attracted to the periphery of one of the cups 34 or 35, the vibration of the whole device, induced by the operation of the motor with which it is associated, will tend to aid gravity and the greater magnetism existing at the center of the device to draw that particle downwardly toward the bottom of the cup. The vibratory action likewise will assist in causing matter accumulated in the upper cups to pass downwardly through openings 38 into the cups beneath. I also believe that the vibrations accounts in some measure for the success of the device in extracting non-magnetic particles as well as magnetic particles from the oil.

To the end that I may utilize as far as possible the beneficial effects of vibration I prefer to mount this device upon the type of bracket shown at 17 in Fig. 1. As previously stated this bracket comprises simply a single piece of resilient metal and the chamber 15 is suspended from the bracket as shown.

While the clarifying device above described is particularly adapted for use upon a motor vehicle, its value is not restricted to this use. So far as I am aware this device is the first practical clarifying device through which the liquid to be clarified can be passed with any degree of rapidity. Concerns now engaged in vending oil use filters through which the oil requires several hours to pass, whereas the same quantity of oil may be clarified in my device in a few minutes. I have connected the chamber 15 in an oil line through which oil was fed by gravity and have energized the winding 40 with electricity from a lighting circuit with good results. Black, gritty oil passed through the device was dischargd free from grit and with original light color restored. Similarly I have applied this device to motor vehicles wherein the motors contained oil which was black, gritty and apparently non-viscous and after a few miles, operation of the vehicle the oil has been freed from its grit and its viscosity and light color have been restored.

Although I have described my invention with particular reference to a device adapted to clarify oil, I do not desire to limit myself to a device of this sort since it is obvious that the structure herein disclosed is adapted to clarify and purify any liquid of whatever nature and remove therefrom magnetic and non-magnetic solids as well as liquids of comparatively greater density than the liquid to be clarified.

While I regard the particular shape and construction illustrated as being an extremely simple and convenient embodiment of my invention, and while I believe that by utilizing the construction illustrated, devices embodying my invention can be reduced in size to occupy a minimum space for a given capacity, I, nevertheless, do not wish to limit my invention in any way to the particular construction above disclosed.

It will be clear to those skilled in the art that many other constructions might be adopted in which the inclined baffle plates and magnetic elements of the present disclosure might be rearranged to utilize the principle discussed above, whereby the foreign matter, once separated from the liquid flowing through the device, is withdrawn by magnetism and gravity to a point remote from the path of flow of the liquid and is there maintained against the possibility of becoming again taken up by the liquid.

I claim:

1. The combination with an oil passage including a chamber, of a magnetic body disposed in said chamber in the path of fluid therethrough, a second chamber beneath said magnetic body and in communication with said first chamber and remote from the path of fluid therethrough, a coil having said magnetic body within its influence, and an intermittently operated source of electrical energy operatively connected with said coil, whereby said body will be intermittently magnetically active to remove magnetic particles from fluid passing through said chamber and a large portion of said particles upon their release from said body during the magnetic inactivity thereof will finally pass into said second chamber.

2. The combination with a fluid duct including a chamber, of a plurality of spaced magnetizable plates inclined within said chamber and having their upper margins in the path of fluid flow therethrough, said chamber providing a settling cavity in a position to receive material gravitationally from said plates and remote from the path of fluid through said chamber, a coiled electrical conductor including said plates within its magnetic influence and adapted to produce a magnetic field concentrated at a point remote from the upper margins of said plates, and an intermittently operated source of electrical energy to supply current to said conductor, whereby said plates will be magnetically energized intermittently to withdraw magnetic particles from fluid passing their margins and, to release said particles into said cavity upon the intermittent cessation of the supply of electrical current.

3. The combination with a passage arranged to permit of a continuous flow of liquid and provided with a settling chamber, of a plurality of plates of magnetic material spaced in the direction of liquid travel through said passage with upper margins in the path of liquid flow therethrough and adapted to deliver material gravitationally to said chamber, an electrical winding about said passage adapted to be intermittently energized and adapted to produce a magnetic field including said plates with its center at a point remote from said upper margins, whereby magnetizable particles in the liquid of said passage will be wholly withdrawn from said liquid when said winding is energized and a large portion of such particles will be ultimately delivered to said chamber when said winding is de-energized.

4. A clarifying device for liquids, said device comprising a chamber, a set of elements within the chamber each having one margin elevated and so arranged as to permit liquid flow across their elevated margin, and means for creating a magnetic field embracing said chamber, and passing axially through all portions of said chamber.

5. A clarifying device for liquids, said device comprising a chamber, a series of inclined elements within the chamber, each of said elements having one margin elevated, said elements being constructed of magnetic material, means for passing liquid to be clarified through said chamber and upwardly across the upper margins of said inclined elements, and means for magnetizing said elements.

6. A clarifying device for liquids, said device comprising a chamber, a series of inclined elements so disposed within the chamber as to permit liquid flow across their upper margins, means for passing liquid to be clarified through said chamber and upwardly past the upper margin of said inclined elements, means for creating a magnetic field embracing said elements, and means for concentrating the intensity of said field adjacent the lowest portions of said elements.

7. A clarifying device for liquids, said device comprising a chamber, means for inducing a flow of liquid through said chamber, spaced elements within said chamber having relatively quiet areas between them remote from the path of liquid flow through the chamber, and means for creating a magnetic field including said elements.

8. A clarifying device for liquids, said device comprising a chamber, means for inducing a flow of liquid through the chamber, spaced elements within said chamber having their margins exposed to the liquid flowing therethrough, the area between said elements being comparatively quiet and remote from the path of flow of liquid through the chamber, means for creating a magnetic field including said chamber, and means for concentrating the intensity of the magnetic field in the area remote from the main path of flow of the liquid.

9. A clarifying device for liquids, said device comprising a chamber, spaced elements constructed of magnetic material disposed within said chamber, means for passing liquid to be clarified through the chamber, and an exciting coil surrounding said chamber for magnetizing said elements.

10. A clarifying device for liquids, said device comprising a chamber, a support of magnetizable metal centrally disposed therein, spaced elements of magnetizable material mounted upon said support and a conductor coiled about said chamber and adapted when energized to create a magnetic field including said chamber, the central support and spaced elements being so disposed as to constitute a core for the coiled conductor.

11. A clarifying device for liquids, said device comprising a chamber having a portion protected from currents or liquid flowing through the chamber, means for inducing a flow of liquid through the chamber, a series of spaced elements of magnetizable material having their margins exposed to the flow of liquid within the chamber, a central support for said elements, said support being also of magnetizable material, and an electrical conductor so disposed that current carried thereby will energize said coil and said elements.

12. A clarifying device for liquids, said device comprising a chamber, an electrical winding exterior to said chamber, a support of magnetic material centrally disposed therein, a series of spaced elements of magnetic material mounted upon the support, said support and said elements constituting a core for said winding, and means for drawing off from the space between said elements matter there accumulating.

13. A clarifying device for liquids, said device comprising a peripherally grooved chamber of substantially circular cross-section, an electrical conductor wound within said groove and forming a coil exterior to said chamber, a substantial mass of magnetic material centrally disposed within said chamber, a set of spaced elements of magnetic material symmetrically disposed about said mass of similar material, means for inducing a flow of liquid through said chamber and past the margins of said elements, and means for drawing from between said elements material there accumulating.

14. A clarifying device for liquids, said device comprising a two-part chamber of circular cross-section provided with an opening in its bottom and inlet and outlet ports, a cock controlling the opening, means for obstructing the circulation of liquid throughout the portion of said chamber adjacent said opening, means for inducing a flow of liquid upwardly through said chamber, a core of magnetic material centrally disposed therein, a series of baffle elements of magnetic material provided with openings in their bottom portions and vertically spaced within said chamber in the path of liquid flow therethrough, the area available for liquid flow being limited about said elements, and means for creating a magnetic field including said chamber.

15. A clarifying device for liquids, said device comprising a two-part chamber of circular cross-section provided with an opening in its bottom and inlet and outlet ports, a cock controlling the opening, means for obstructing the circulation of liquid throughout the portion of said chamber adjacent said opening, means for inducing a flow of liquid upwardly through said chamber, a core of magnetic material centrally disposed therein, a series of baffle elements of magnetic material provided with openings in their bottom portions and vertically spaced within said chamber in the path of liquid flow therethrough, the area available for liquid flow being limited about said elements, means for creating a magnetic field including said chamber, and means for subjecting said chamber to vibration.

16. A device for removing impurities in a circulatory lubricating system comprising a chamber adapted to be incorporated in said system, magnetizable baffle elements spaced within said chamber to form a series of pockets therein, the direction of flow of the lubricant through said chamber being across the open mouths of the pockets and the area of said pockets being lower than the mouths, and means for subjecting said chamber to the influence of a magnetic field whereby said baffle elements are magnetized and tend to withdraw magnetizable foreign matter from the lubricating matter passing through said chamber, said pockets being adapted to retain such matter irrespective of the continuance or discontinuance of the magnetic field.

17. The combination with an internal combustion engine provided with a circulatory system including a chamber, and a settling cavity in communication therewith, of an electrical generator arranged to be driven from said engine, and electromagnetically energized separator means operatively connected with said generator to receive energy therefrom during the actuation of said engine and to be deenergized when such engine stops, and operatively associated with said chamber and above said cavity for the gravitational delivery of such material to said cavity when said electromagnet is de-energized.

18. The combination with an internal combustion engine having a circulatory lubrication system and an electric generator, of electromagnetic means operated from said generator associated with said system and adapted wholly to remove magnetically attractable particles from the path of fluid in said system, whereby upon the stopping of the engine and the consequent cessation of the current supply of said generator to the electromagnetic means such particles will not be restored to said system.

19. The combination with an internal combustion engine, an electric generator driven therefrom, a storage battery and a circuit breaker connected in series with the generator and the battery, of a lubricating system for said engine, means for circulating oil in said lubricating system, a chamber adapted to be connected in said system, magnetizable elements in the path of the oil within said chamber, and a coil of wire interposed between the generator and the battery and adapted to receive electric current produced by the generator and to utilize said current to energize said baffle elements, the flow of said electric current to said coil ceasing when said engine stops.

20. The combination with an internal combustion engine, an electric generator driven therefrom, a battery and a cut-out connected in series with the generator and the battery, of a circulatory lubricating system for said engine, a chamber within said system, means subject to the control of said cut-out for utilizing the current passing between the generator and the battery for developing a magnetic field including said chamber, the flow of said current to said means ceasing when said engine stops, means for subjecting said chamber to the vibrations of the engine, a core of magnetizable material centrally disposed within said chamber, cups spaced apart within said chamber and the path of liquid flow therethrough and provided with openings in their bottoms, and means for sequestering in said chamber foreign matter lodging therein, whereby irrespective of the operation of said generator foreign matter will not be returned to said lubricating system and the flow of lubricant within said system will be unobstructed.

21. In combination with an internal combustion engine provided with a circulatory lubricant system, a chamber in communication with said system and through which the fluid passes, an electro-magnetically energized separator in said chamber and substantially in the path of said fluid for removing impurities therefrom, and means operatively connected with said engine for automatically energizing and de-energizing said separator means upon starting and stopping of the motor, said separator being adapted to permit gravitational movement of the magnetically attracted particles out of the path of said fluid when de-energized.

22. In combination with an internal combustion engine provided with a circulatory lubricant system, a chamber in communication with said system and through which the fluid passes, an electro-magnetically energized separator in said chamber and substantially in the path of said fluid for removing impurities therefrom, means operatively connected with said engine for automatically energizing and de-energizing said separator means upon starting and stopping of the motor, and means for de-energizing said separator when the motor speed falls below a predetermined rate, said separator being adapted to permit gravitational movement of the magnetically attracted particles out of the path of said fluid when de-energized.

23. In combination with an internal combustion engine provided with a circulatory lubricant system, a chamber in communication with said system and through which the fluid passes, an electro-magnetically energized separator in said chamber and substantially in the path of said fluid for removing impurities therefrom, and means operatively connected with said engine for automatically energizing and de-energizing said separator means upon starting and stopping of the motor, said separator being adapted to permit gravitational movement of the magnetically attracted particles out of the path of said fluid when de-energized and including a collecting pocket substantially removed from the path of lubricant through said chamber adapted to receive material which gravitationally moves relative to said magnetic means when the latter is de-energized.

24. In combination with an internal combustion engine provided with a circulatory lubricant system, a chamber in communication with said system and through which the fluid passes, an electro-magnetically energized separator in said chamber and substantially in the path of said fluid for removing impurities therefrom, means operatively connected with said engine for automatically energizing and de-energizing said separator means upon starting and stopping of the motor, and means for de-energizing said separator when the motor speed falls below a predetermined rate, said separator being adapted to permit gravitational movement of the magnetically attracted particles out of the path of said fluid when de-energized, and including a collecting pocket substantially removed from the path of lubricant through said chamber adapted to receive material which gravitationally moves relative to said magnetic means when the latter is de-energized.

ALBERT L. RASEY.